United States Patent [19]

Mürner

[11] Patent Number: 4,641,683
[45] Date of Patent: Feb. 10, 1987

[54] VALVE ARRANGEMENT FOR CONTROLLING THE FLOW OF MEDIUMS

[75] Inventor: Ulf Mürner, Crailsheim, Fed. Rep. of Germany

[73] Assignee: Voith Turbo GmbH & Co. KG, Fed. Rep. of Germany

[21] Appl. No.: 754,848

[22] Filed: Jul. 12, 1985

[30] Foreign Application Priority Data

Jul. 24, 1984 [DE] Fed. Rep. of Germany ....... 3427204

[51] Int. Cl.⁴ ............................................. G05D 16/00
[52] U.S. Cl. .................................................. 137/487.5
[58] Field of Search ............................. 137/487.5, 486

[56] References Cited

U.S. PATENT DOCUMENTS

| | | |
|---|---|---|
| 3,586,027 | 6/1971 | Fitzgerald .................... 137/487.5 X |
| 3,775,622 | 11/1973 | Fredericks .................... 137/487.5 X |
| 4,253,480 | 3/1981 | Kessel ............................ 137/487.5 |

Primary Examiner—Alan Cohan
Attorney, Agent, or Firm—Jeffers, Irish & Hoffman

[57] ABSTRACT

A valve arrangement for controlling the flow of mediums, specifically of gases or liquids in pipelines or similar conduits comprising an on-off valve, a throttle positioned downstream of the on-off valve, and a pressure sensor arranged between the on-off valve and the throttle. An actuator is also provided which upon a pressure increase at the pressure sensor causes the immediate or retarded closing of the on-off valve, and at pressure drop the immediate or retarded opening of the on-off valve.

11 Claims, 1 Drawing Figure

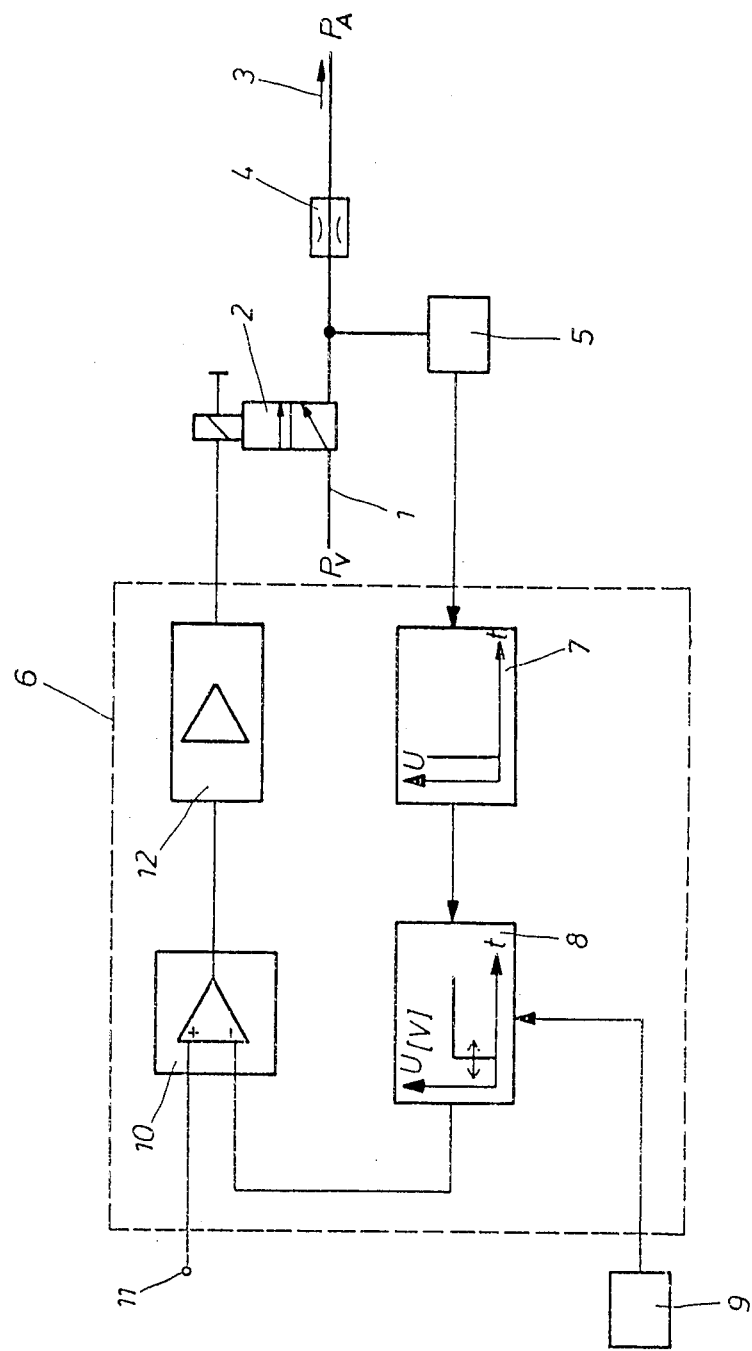

VALVE ARRANGEMENT FOR CONTROLLING THE FLOW OF MEDIUMS

BACKGROUND OF THE INVENTION

The invention is directed to a valve arrangement for controlling the flow of mediums, specifically gases or liquids, in pipelines or similar conduits.

Proportional valves have been previously known where the flow through the valve is controllable by proportional adjustment of a slide and/or the valve head. However, such valves are expensive in design, and normally are too unreactive or slow-acting for application in quick control processes. Lastly, these valves possess a limited control range so that in the case of a valve designed for a high flow rate, the valve can normally not be adjusted to provide a small amount of flow.

It has already been suggested to employ for flow control simple on-off valves which are periodically opened for a brief period of time and where the duration of the open time determines the amount of flow. However, with such valves, it is not possible to adjust to very small flow rates since the preselected open time must not fall below a specific value in order to ensure that the valve head will actually lift off the valve seat. While it is possible to arrange several of such on-off valves having various flow rates in a parallel fashion and activate them so that the valve which provides the desired flow will be activated, such an arrangement is very expensive due to the use of a plurality of such valves.

SUMMARY OF THE INVENTION

The problem underlying the invention is to fashion a valve arrangement for controlling the flow of mediums, specifically gases or liquids, in pipelines or similar conduits wherein the valve arrangement provides a wide flow control range while retaining a simple design and reliable operation.

An arrangement solving this problem is characterized by an on-off valve, a throttling element downstream of the on-off valve, and additionally a pressure sensor arranged between the on-off valve and the throttle element, as well as an actuator which upon a pressure rise at the pressure sensor will bring about the immediate or retarded closure of the on-off valve while effecting its immediate or retarded opening upon a pressure drop.

To begin with, the progress achieved by the invention is associated with the fact that the valve arrangement features only a single on-off valve of simple design, and therefore, of a reliable operation. Moreover, this valve arrangement has the advantage that no minimum open time need be provided for activating the on-off valve, but that the completed liftoff of the valve head from the valve seat, through the pressure increase, is registered by the pressure sensor, so that immediately thereafter the valve can be closed again. In this way it is possible to precisely control the flow of very small amounts of medium even with an on-off valve designed for high flow rates.

As a preferable embodiment of the invention, the on-off valve is formed by an electrically operable solenoid valve. A further advantage is provided by having the pressure sensor being formed by a component converting the pressure to corresponding electrical voltages, since the necessary electrical and/or electronic activation can then be carried out in an especially simple manner.

The actuator features a power amplifier which activates the on-off valve and is activated itself by a voltage comparator whose inverting input is controlled by the pressure sensor and whose uninverted input forms an external control input for controlling the valve arrangement. The actuator may operate in an analog fashion in a way such that the external control input receives a control voltage whose magnitude is correlated with the desired flow rate and/or a specific pressure at the pressure sensor, so that the on-off valve will shut off whenever the output voltage of the pressure sensor falls or exceeds the predetermined value. But also present as a feature of the invention is the possibility that the actuator features a differentiating member which is directly controlled by the pressure sensor. This feature increases the sensitivity of the arrangement since a variable proportional to the pressure change is available as a control signal; moreover, the control component can operate in a digital mode, and thus, guard against malfunction. The external control input serves in this case only as a release input making it possible to shut the entire valve arrangement off or on by means of a digital signal. It is further recommended that the actuator feature a timer with an adjustable time constant following the differentiating member and effecting the time delayed activation of the inverting input of the comparator. This makes it possible to vary the opening and/or closing time of the on-off valve within wide limits. To that end, the timer may suitably be activated by the pressure sensor voltage output caused by the pressure increase. However, it is also within the scope of the invention to activate the timer by the pressure sensor voltage output which is caused by the pressure drop.

Lastly, the actuator may feature an inverter which selectively inverts the voltage output fed to the timer. Thus it is possible to prolong, depending on the inverter position, either the opening phase of the valve or also its closing phase through the timer, thus providing an extremely wide control range for the valve arrangement.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWING

The sole figure in the application illustrates a schematic diagram of a specific embodiment of the invention.

DETAILED DESCRIPTION OF A SPECIFIC EMBODIMENT

The valve arrangement consists essentially of an on-off valve 2 arranged in a line 1, a throttle 4 positioned downstream of the on-off valve 2 (the direction of flow indicated by the arrow 3), and a pressure sensor 5 arranged between the on-off valve 2 and the throttle 4. The activation of the on-off valve 2, designed as an electrically operable solenoid valve, takes place through an actuator 6 featuring for that purpose a power amplifier 12. The actuator 6 is activated by the pressure sensor 5 formed by a component which converts the pressure to corresponding electrical voltages. The output voltage of the pressure sensor 5 is first transmitted to a differentiating member 7 which emits a digital output signal to a timer 8 whose time constant is adjustable through an emitter 9. The output signal of this timer is finally transmitted to the inverting input of a comparator 10 activating the power amplifier 12, with the not inverting input of the comparator 10 forming an internal control input 11 for control of the valve arrangement.

In explaining the operating mode of the specific embodiment, the assumption is made that the time constant of the timer 8 is set to zero which means nothing else than that the output of the differentiating member directly activates the inverting input of the voltage comparator with no time delay. The on-off valve 2 is opened via the power amplifier 12 through application of a positive voltage across the external control input 11, since the voltage on the inverting input of the comparator 10 is at first essentially zero, i.e., at any rate lower than on the not inverting input. Due to the throttle 4, the pressure sensor 5 registers the opening of the on-off valve 2 immediately as a pressure increase which entails a corresponding voltage change in the output of the pressure sensor 5. This voltage change results in a positive voltage at the output of the differentiating member 7 so that by way of the timer 8 a positive voltage occurs on the inverting input of the comparator 10, which voltage surmounts the voltage on the external control input 11. As a result, the comparator 10 turns the power amplifier off which causes the on-off valve 2 to close. Consequently, the pressure between the on-off valve 2 and the throttle 4 drops again which by a sequence of events analogous to those just-described causes the on-off valve 2 to open again. In the just explained sequence, with the time constant of the timer selected at zero, the valve arrangement operates at the maximum possible switching frequency of the on-off valve 2. By selecting a time constant different from zero, the closing of the on-off valve is retarded and, consequently, the opening time of the on-off valve is prolonged on average.

Thus, the on-off ratio of the on-off valve 2 can be adjusted within wide limits by changing the time constant. Specifically, it is possible to arrive at very low flow rates because the pressure increase occurring upon the slightest liftoff of the valve head from the valve seat can immediately lead again to the closing of the on-off valve 2. Thus, it is readily possible to design the on-off valve 2 for high flow rates, thereby obtaining an extremely wide control range of the valve arrangement.

Lastly, although not illustrated in the drawing, there is the possibility of retarding the opening of the on-off valve 2 through the timer 8, making the opening times of the on-off valve 2 small as compared to the closing times. This makes it possible to activate for extremely low flow rates, with a combination of both types of activation once more extending the entire control range of the valve arrangement considerably.

While there have been described above the principles of this invention in connection with specific apparatus, it is to be clearly understood that this description is made only by way of example and not as a limitation to the scope of the invention.

What is claimed is:

1. A valve arrangement for controlling the flow of a medium in a line, comprising:
    an on-off valve arranged in said line in communication with said medium flow and actuatable only between open and closed positions for respectively allowing and blocking said medium flow in said line through said valve,
    a throttle position in said line adjacent to but downstream of said on-off valve,
    a pressure sensor arranged in said line between said on-off valve and said throttle and within such close proximity to said on-off valve and throttle that the activation of said on-off valve to its opened and closed position is sensed by said pressure sensor as a corresponding rise and drop in the pressure of said medium flow in said line between said valve and throttle, said pressure sensor being adapted to convert said sensed pressure rise or drop to a corresponding electrical output signal, and
    an actuator connected between said on-off valve and said pressure sensor and being operable upon receiving said corresponding output signals to cause actuation of said on-off valve to its closed position upon a pressure rise in said medium flow in said line due to a preceding opening of said on-off valve being sensed by said pressure sensor and to cause actuation of said on-off valve to its opened position upon a pressure drop in said medium flow in said line due to a preceding closing of said on-off valve being sensed by said pressure sensor, such that said on-off valve is so actuated repetitively to achieve the desired control of said medium flow through said valve and in said line in dependence upon each preceding actuation thereof.

2. The valve arrangement according to claim 1 wherein said on-off valve comprises an electricall operable solenoid valve.

3. The valve arrangement according to claim 2 wherein said pressure sensor comprises a means for converting the pressure to corresponding electrical voltages.

4. The valve arrangement according to claim 1 wherein said pressure sensor comprises a means for converting the pressure to corresponding electrical voltage.

5. The valve arrangement according to claim 1 wherein said actuator includes:
    a comparator having an inverting input for receiving an input signal corresponding to said output signal of said pressure sensor and a noninverting input for receiving a predetermined control signal, said comparator providing one output signal whenever said input signal is greater than said control signal and another output signal of opposite polarity to said one output signal whenever said input signal is less than said control signal, and
    a power amplifier means for receiving said respective output signals of said comparator and actuating said on-off valve to its opened position in response to said one output signal to its closed position in response to said opposite output signal.

6. The valve arrangement according to claim 5 wherein said actuator further includes a differentiating member which is directly activated by said pressure sensor, said differentiating member for receiving said output signal of said pressure sensor and producing an output signal proportional to the change in said output signal of said pressure sensor over time.

7. The valve arrangement according to claim 6 wherein said actuator further includes a timer means with an adjustable time constant, operatively connected between said differentiating member and said inverting input of said comparator, for effecting an adjustably preset delayed activation of said inverting input of said comparator for retarding one or the other of said actuation of said on-off valve to its opened or closed positions.

8. The valve arrangement according to claim 7 wherein said timer means is activated by said output signal of said pressure sensor as caused by a rise in the pressure of said medium flow due to a preceding actuation of said on-off valve to its opened position.

9. The valve arrangement according to claim 7 wherein said timer means is activated by said output signal of said pressure sensor as caused by a drop in the pressure of said medium flow due to a preceding actuation of said on-off valve to its closed position.

10. The valve arrangement according to claim 8 wherein said actuator includes an inverter means for selectively inverting the output signal transmitted to said timer means.

11. The valve arrangement according to claim 9 wherein said actuator includes an inverter means for selectively inverting the output signal transmitted to said timer means.

* * * * *